United States Patent [19]

Astheimer

[11] Patent Number: 4,883,364

[45] Date of Patent: Nov. 28, 1989

[54] APPARATUS FOR ACCURATELY MEASURING TEMPERATURE OF MATERIALS OF VARIABLE EMISSIVITY

[75] Inventor: Robert W. Astheimer, Westport, Conn.

[73] Assignee: Barnes Engineering Company, Shelton, Conn.

[21] Appl. No.: 270,735

[22] Filed: Nov. 14, 1988

[51] Int. Cl.$^4$ ............................. G01J 5/06; G01J 5/12
[52] U.S. Cl. ....................................... 374/129; 374/9; 374/126; 374/123; 356/43
[58] Field of Search ............... 374/121, 123, 126, 129, 374/9; 356/43

[56] References Cited

U.S. PATENT DOCUMENTS

| | | | |
|---|---|---|---|
| 2,690,078 | 9/1954 | Phillips, Jr. | 374/129 |
| 2,737,809 | 3/1956 | Fastie | 374/129 |
| 3,285,069 | 11/1966 | Weiss | 374/133 |
| 3,462,224 | 8/1969 | Woods et al. | 374/126 |
| 3,492,869 | 2/1970 | Toyota et al. | 374/129 |
| 3,539,807 | 11/1970 | Bickel | 374/129 |
| 3,796,099 | 3/1974 | Shimotsuma | 374/129 |
| 4,144,758 | 3/1979 | Roney | 374/129 |
| 4,433,924 | 2/1984 | Quinn, III | 374/129 |
| 4,435,092 | 3/1984 | Iuchi | 356/43 |
| 4,465,382 | 8/1984 | Iuchi et al. | 374/9 |
| 4,776,825 | 10/1988 | Giebeler | 374/129 |

FOREIGN PATENT DOCUMENTS

| | | | |
|---|---|---|---|
| 659613 | 2/1965 | Belgium | 374/129 |
| 2731660 | 1/1978 | Fed. Rep. of Germany | 374/129 |
| 214147 | 3/1968 | U.S.S.R. | 374/129 |

OTHER PUBLICATIONS

Kelsall, D., "An Automatic Emissivity-Compensated Radiation Pyrometer", Journal of Sci. Instrum., Jan. 1963.

Primary Examiner—William A. Cuchlinkski, Jr.
Assistant Examiner—Diego F. F. Gutierrez
Attorney, Agent, or Firm—Parmelee, Bollinger & Bramblett

[57] ABSTRACT

A temperature measuring apparatus is provided for determining the temperature of a target material to be measured as compared with the temperature of a spaced reference source which has a temperature control for controlling the temperature of the reference source. A differential radiation detector having a first detector exposed to the target material and a second detector which is shielded from the target material and exposed to the reference source provides a differential output or error signal which is used to control the temperature of the reference source. When the reference source temperature is the same as the target, the temperature of the reference source is read out which is the temperature of the target material regardless of the emissivity. The differential radiation detector is positioned in spaced relation to the target material and is focused onto the target and the reference material and the error signal generated is used for controlling the temperature of the reference source. The reference source is preferably a heated plate having a step in the center thereof with a hole therein through which the differential detector means views the target as well as the plate. Using a hole prevents reflection from the target back through the plate to areas of uncontrolled temperature.

1 Claim, 1 Drawing Sheet

APPARATUS FOR ACCURATELY MEASURING TEMPERATURE OF MATERIALS OF VARIABLE EMISSIVITY

BACKGROUND OF THE INVENTION

This invention relates to apparatus for accurately and continuously measuring temperature of a target material regardless of the emissivity of the material being measured.

One of the difficulties in measuring the temperature of a target material is the fact that such measurement is completely at the mercy of changes in emissivity of the surface because the amount of radiation from a surface at a particular temperature varies with the emissivity. The emissivity of a target material frequently changes in an unpredictable manner because of physical differences in different areas of the target which could be caused by changes in manufacturing operations, changes in the surfaces viewed due to oxidation or to the presence of foreign materials such as dirt, oils, waxes and the like which have emissivities that differ from that of the underlying target material. The perfect radiator or black body is characterized by the fact that the energy which it emits depends only on the temperature of the body. A non-black body radiator emits only a fraction of the energy emitted by a perfect radiator. This fraction is known as the emissivity of the body. Accordingly, in order for the energy emitted by the non-black body to be accurately determined, the emissivity must be known. However, there are many target materials whose temperature is desired to be known, such as hot rolling of tin plate, processing of plastic films at elevated temperatures and the like which may involve variations in the surface for example, by oxidation or other means which change the emissivity of the surface whose temperature is being measured. As a result the temperature measuring device will provide an inaccurate reading.

A number of approaches have been utilized to compensate or treat this problem. For example, in U.S. Pat. No 2,611,541 to Gray a heated source whose temperature is controlled is spaced from a workpiece whose temperature is to be measured, where the function of the source is to provide a known reflective background which reduces emissivity errors but does not eliminate them. Gray provides a pyrometer which views only the workpiece directly and gives a signal representative only of the temperature of the workpiece. The heated source of Gray is independent of the actual temperature of the workpiece and accordingly, a change in emissivity of the workpiece will still cause an error in the pyrometer output signal which is used to measure the temperature.

In Weiss U.S. Pat. No. 3,285,069, which is assigned to the Assignee of the present invention, the problem is treated using a differential infrared detector embedded in a temperature control plate which is mounted close to the target. One of the detector elements of the differential detector responds to the plate temperature and the other detector element to the target temperature. The differential detector signal is employed as an error signal to a temperature controller which drives the reference temperature toward that of the target. When the error signal is zero, the plate will be at the same temperature as the target regardless of the emissivity of the target material. This plate temperature is read out which in effect is the target temperature regardless of the emissivity of the target material.

The problem of this approach is that the differential detector is embedded in the reference plate, and accordingly must operate at the target temperature. The target temperature is often too high for the detector to withstand, and therefor the detector is destroyed. Another problem is that the plate must be relatively massive to contain the detector which restricts the frequency response. The more massive the reference plate the more difficult it is to rapidly heat the plate to elevated temperatures.

SUMMARY OF THE INVENTION

Accordingly, it is an object of this invention to provide an improvement in the temperature measuring capabilities of the aforesaid U.S. Pat. No. 3,285,069 which overcomes the aforesaid difficulties.

Another object of this invention is to provide a new and improved apparatus for accurately measuring the temperature of materials of low and variable emissivity which permits the accurate measurement of very high temperatures without destroying the detectors used in such measurements.

Another object of this invention is to provide a new and improved temperature measuring apparatus which is independent of emissivity of the object being measured and which does not require massive reference sources or restrict the frequency response of the system.

Still another object of this invention is to provide a new and improved apparatus for accurately measuring the temperature of a target surface regardless of the emissivity of that target which is relatively simple, efficient and less subject to malfunction than previous systems.

In carrying out this invention in one illustrative embodiment thereof, temperature measuring apparatus is provided for determining the temperature of a target material to be measured as compared to the temperature of a spaced reference source having a temperature control means which controls the temperature of the spaced reference source whose temperature is read out when it is the same as that of the target material. A differential radiation detection means has a first detector means exposed to the target material for measuring the temperature thereof and a second detector means shielded from the target material and exposed to the reference source for measuring the temperature of the reference source. Means ar provided for locating the differential radiation detector means in spaced relation to the target material and the reference source, means are provided for focussing the differential detector means on the target material and the reference source, with the first detector means of the differential radiation detection means being exposed to the target material and the second detector means being exposed only to the reference source. The differential output of the differential detector means in the form of an error signal is applied to the temperature control means for driving the reference source to the same temperature as the target material thereby reducing the differential error signal to zero. When the error signal is zero, the temperature of the target is the same as the reference source regardless of the emissivity of the target material. The reason for this is that all reflections from the target view the reference source. The temperature is read out by monitoring the temperature of the reference source.

Preferably, the reference source is in the form of a plate having a step near the center with a hole therein with the first detector means focussed through the hole onto the target material while the second detector means of the differential detector is focussed on the plate.

BRIEF DESCRIPTION OF THE DRAWINGS

The invention, together with further objects, aspects, features and advantages thereof will be more clearly understood from the following description taken in connection with the accompanying drawings.

DESCRIPTION OF THE PREFERRED EMBODIMENTS

Figure 1:
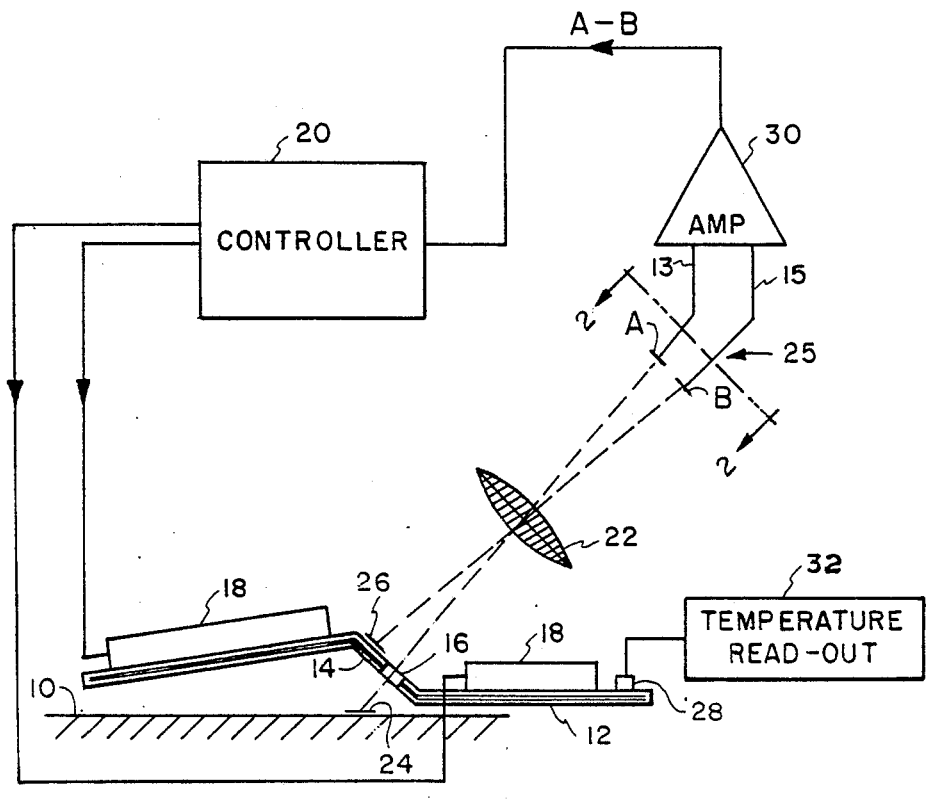
FIG. 1 is a circuit block diagram of the apparatus for accurately measuring temperature of materials of variable emissivity in accordance with the present invention.

Referring now to FIG. 1, a target material 10 having a temperature $T_t$ which is desired to be measured may be in the form of a long moving strip such as hot rolled tinplate, plastic, or the like, or for that matter a stationary target material such as, for example, an electronic circuit board. Spaced from the target material 10 is a reference source 12 in the form of a temperature controlled plate having a step or angled portion 14 near the center thereof with a hole 16 centrally located in the step 14. Heating or cooling elements 18 are thermostatically controlled by a controller 20 which is provided to maintain the temperature of the reference source or plate 12 at a temperature $T_p$ which is essentially maintained at the same temperature $T_t$ as the target as will be explained hereinafter. It will be appreciated that the controller 20 is suitable for controlling the temperature whether the temperature is increasing or decreasing and that the elements 18 may accordingly be separate heating and cooling elements both under the control of the controller 20. A differential detector 25 having first detector means A and second detector means B are provided with detector A focussed by a lens 22 through the hole 16 to form an image 24 of detector A on the surface of the target material 10. At the same time, detector means B is focussed on the step 14 of the temperature controlled plate 12 forming an image 26 of detector B on the temperature controlled plate or reference source 12. The output of the differential detector 25 from detectors A and B are applied to a differential amplifier 30 producing an output of detector A minus detector B which is applied to the controller 20 for controlling the heating or cooling elements 18 and according, the temperature $T_p$ of the temperature controlled plate or reference source 12. A temperature sensor 28 monitors the temperature $T_p$ of the plate 12 and is connected to a temperature read out 32 which provides the temperature $T_p$ of the plate. When the output of the differential amplifier 30, namely detector A minus detector B equals 0, then $T_p$ equals $T_t$. The emissivity in the measurement of the target temperature is thus removed.

Figure 2:
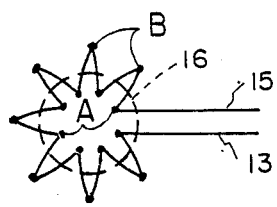
FIG. 2 is one form of differential detector means which may be utilized in the temperature system illustrated in FIG. 1.

The differential detector 25 may be in the form of a thermopile such as shown in the aforesaid U.S. Pat. No. 3,285,069 having the star configuration illustrated in FIG. 2. The inner junctions A produce a signal of the same polarity and are imaged through the hole 16 onto the target material 10, while the surrounding outer ring of junctions B all give signals of the opposite polarity and view a preferably blackened area 26 of the temperature control plate 12 around the hole 16. The leads 13 and 15 are connected to the junctions A and B and applied to the differential amplifier 30. If the temperature controlled plate 12 and the target material 10 are at the same temperature, there is a radiation balance and both sets of junctions A and B of the thermopile detector 25 are at the same temperature, accordingly, no voltage is developed in the leads 13 and 15, and no output is developed by the amplifier 30 to be applied to the controller 20. When a difference occurs, an error signal is applied to the controller activating the heating or cooling elements 18 to heat up or cool down the plate 12 until a radiation balance again occurs in the differential detector 25.

Although a thermopile type of detector is the referred form of differential detector means 25, any other known differential radiation detector may be used, for example, a thermmistor bolometer in which the active flake is imaged on the target while the reference flake is imaged on the temperature controlled reference plate 12.

When there is a radiation balance from the differential detector, the temperature reading from the readout 32 will not be affected by the emissivity of the material 10 or surface of the plate 12, although the emissivity of the reference plate 12 is preferably blackened and high or substantially higher than that of the target material 10. Regardless of the emissivity of the two surfaces, in each case the total radiation will add up to the same figure provided that the two surfaces are of the same temperature.

The step 14 near the center of the plate 12 permits viewing the target material 10 at an angle so that no rays from the differential detector 25 can reflect from the target back through the hole to prevent the detector from seeing anything other than the target or reference plate. The purpose, of course, is to make sure that the differential detector 25 views only the target and the temperature controlled plate. The reference source plate must be sufficiently close and long enough so that any multiple reflections of the "A" field of view between the two plates are completely absorbed.

By separating the differential detector from the heated plate, the differential detector is protected from being destroyed from operating at target temperatures which would destroy the detector if the target temperatures to be measured were extremely high when the detector is embedded in the plate as has been the case in the past. Also, by separating the differential detector from the plate, the detector may respond quickly which would not be the case if the detector is embedded or part of the massive temperature controlled plate.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. In a temperature measuring apparatus for determining the temperature of a target material to be measured as compared to the temperature of a spaced reference source having temperature control means for controlling the temperature of the spaced reference source and differential radiation detector means having first detector means exposed to said target material for measuring the temperature of said target material and exposed to said reference source for measuring the temperature of the reference source, the improvement comprising:

means for locating said differential radiation detector means in spaced relationship to said target material and said reference source, said reference source is a plate having a step near the center of said plate, said step containing a hole therein, optical means for focusing said differential radiation detector means through said hole onto said target material and said reference source, said first detector means of said differential radiation detection means being exposed to said target material and said second detector means being exposed only to said reference source, said step containing said hole permitting viewing the target material at an angle through said hole to prevent reflection from said detector means back through said hole, means for combining the outputs of said first and second detector means to produce a differential error signal, means for applying said differential error signal to said temperature control means for driving said reference source to the same temperature of said target material, and temperature read out means for indicating the temperature read out means for indicating the temperature of said reference source which will have the same as that of said target material when the differential error signal in zero regardless of the emissivity of the target material.

\* \* \* \* \*